April 15, 1941.   R. F. GOECKE   2,238,318
METHOD OF AND APPARATUS FOR TEMPERATURE CONTROL
Filed Sept. 9, 1938   2 Sheets-Sheet 1
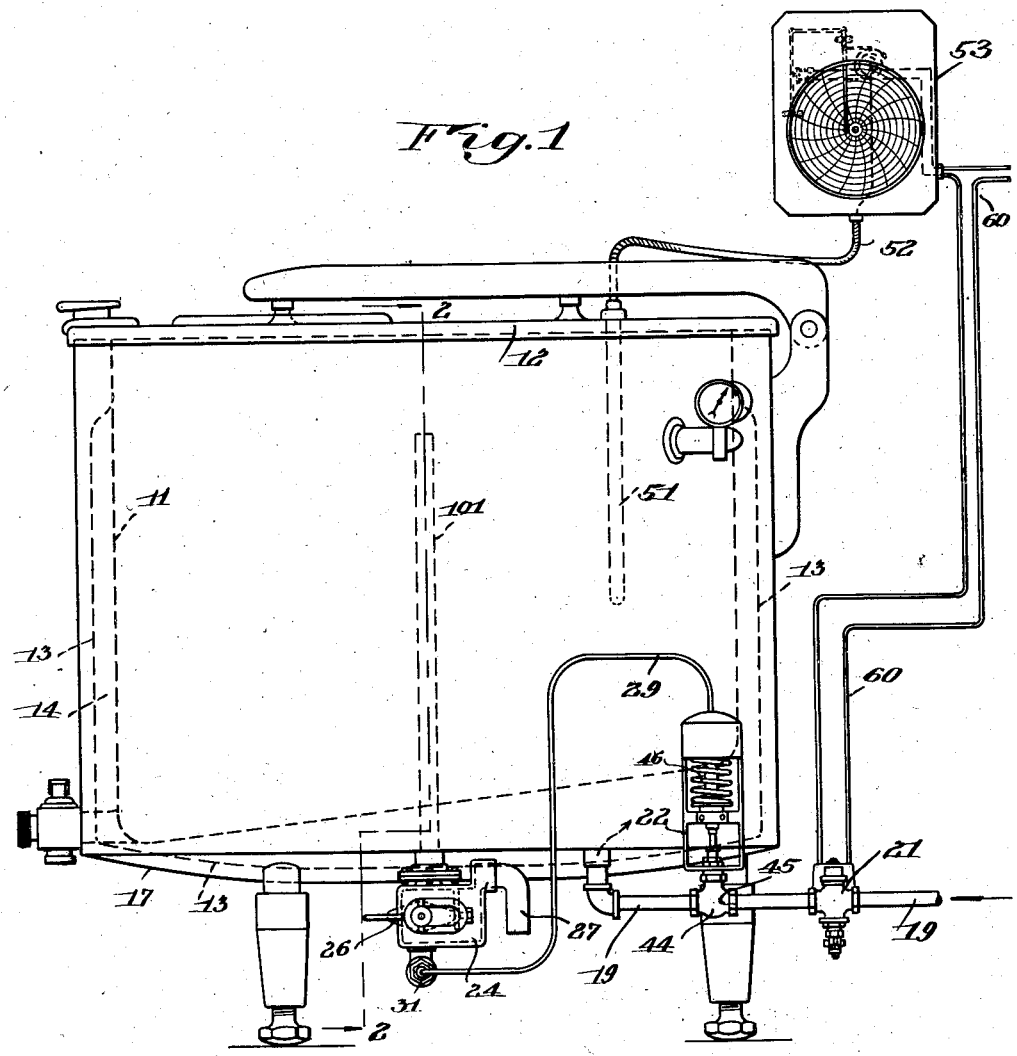
INVENTOR.
Rudolph F. Goecke
BY Cumpston & Shepard
his ATTORNEYS April 15, 1941.  R. F. GOECKE  2,238,318
METHOD OF AND APPARATUS FOR TEMPERATURE CONTROL
Filed Sept. 9, 1938   2 Sheets-Sheet 2
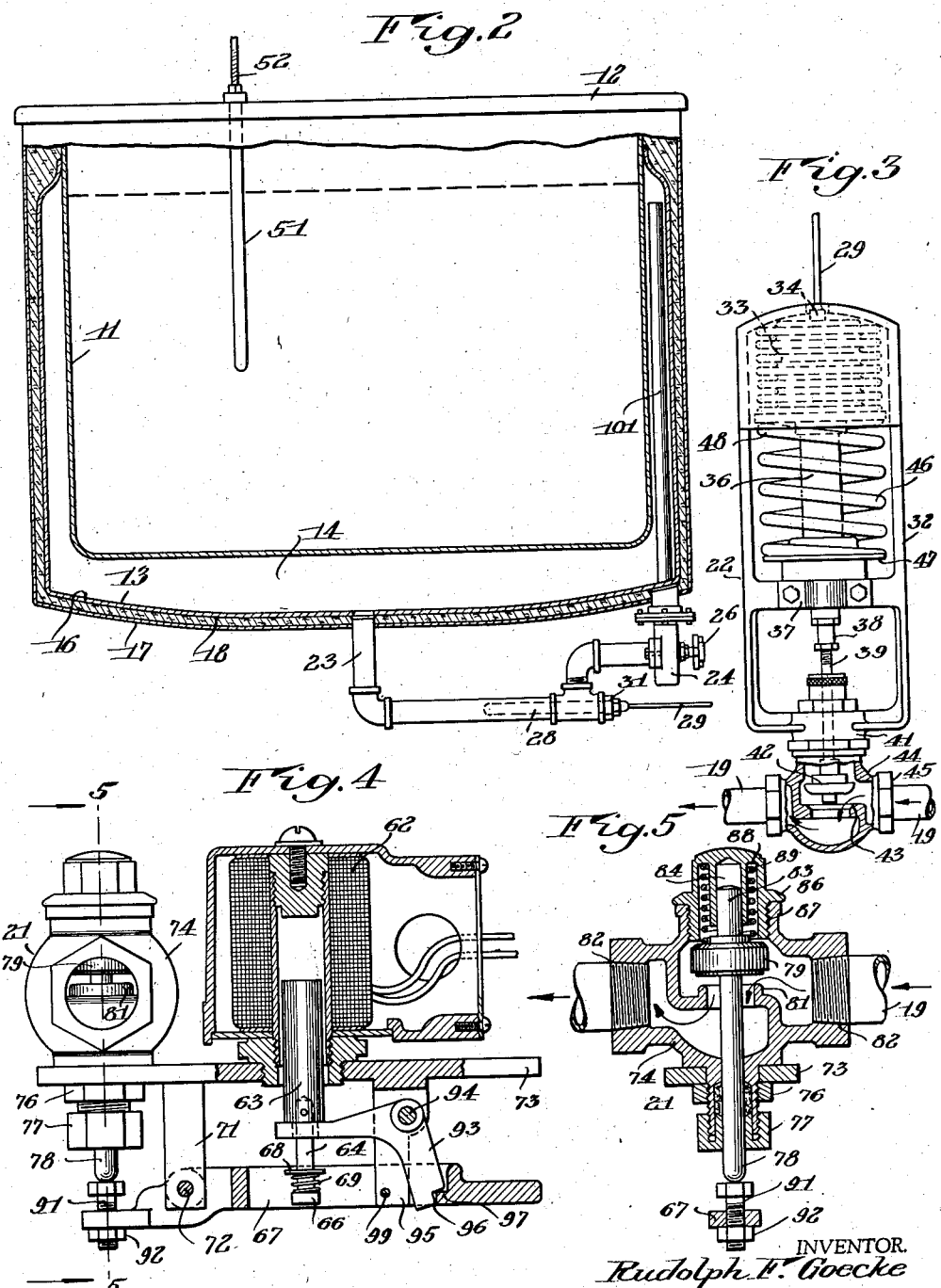
INVENTOR.
Rudolph F. Goecke
BY 
his ATTORNEYS Patented Apr. 15, 1941

2,238,318

UNITED STATES PATENT OFFICE 2,238,318

METHOD OF AND APPARATUS FOR TEMPERATURE CONTROL

Rudolph F. Goecke, Elyria, Ohio, assignor to The Pfaudler Co., Rochester, N. Y., a corporation of New York Application September 9, 1938, Serial No. 229,163

1 Claim. (Cl. 236—18)

My invention relates to a method of and apparatus for controlling temperature in processing apparatus. For purposes of illustration and description the invention is illustrated in apparatus intended primarily for pasteurizing or otherwise processing milk or cream, although it will be apparent that my novel method of and apparatus for controlling temperature has other applications.

An object of my invention is to provide a method of and apparatus for controlling the temperature of the liquid, such as milk, or other material being processed, so that the temperature of the contents of the vat, in which the processing is being carried out, is brought up to the desired temperature without going beyond that temperature or overriding.

Another object of my invention is to provide a novel method of and apparatus for controlling the temperature of the contents of the vat, wherein the processing operations are being carried out, in accordance with variations in the condensate temperature of the steam used for heating the vat contents.

My invention further contemplates the provision of a novel method of and apparatus for controlling the temperature of the contents of the vat, wherein processing operation are being carried out, in which the steam flow to the jacket of the vat is controlled by a throttling valve operable in accordance with the steam condensate flowing from the jacket, and wherein a second valve is employed to cut off the flow of steam when the temperature of the contents of the vat approaches the desired temperature, the combination of valves and control therefor enabling close regulation of the temperature so as to prevent the contents of the vat overriding the desired temperature.

To these and other ends the invention resides in certain improvements and combinations of parts, all as will be hereinafter more fully described, the novel features being pointed out in the claim at the end of the specification.

In the drawings:

Fig. 1 is a side elevation partly diagrammatic of a processing vat in which my novel apparatus for controlling the temperature of the vat contents is employed;

Fig. 2 is a section through the vat taken on the line 2—2 of Fig. 1 and showing the condensate drain line;

Fig. 3 is a view of a portion of Fig. 1 showing in detail the throttling valve for the steam inlet line;

Fig. 4 is a view of the solenoid operated shut-off valve used in the steam inlet line;

Fig. 5 is a view taken on the line 5—5 of Fig. 4, and

Fig. 6 is a diagrammatic view showing the recording thermometer.

The same reference numerals throughout the several views indicate the same parts.

One of the distinct problems in processing materials, particularly food products, as in the pasteurization of milk, is the provision of adequate means for controlling temperature so that close temperature regulation is possible and so that the contents of the vat, for example, the milk being pasteurized, is not heated beyond the pasteurization temperature. While I have shown my invention as applied to a vat for pasteurizing milk or cream, and will describe my invention in that connection, it will be apparent that the novel method and apparatus of my invention for controlling temperature may be applied to other processes wherein steam is employed as the heating medium.

The apparatus to which my novel temperature control is applied comprises a container or vat 11 having an opening of substantial size preferably at its top adapted to be closed by a cover 12. The vat is surrounded at its sides and bottom by a jacket 13 which is spaced from the walls of the vat to provide a jacket space 14 for the circulation of a heating medium, such as steam or a cooling medium, such as water. The jacket 13 comprises an inner wall 16 and an outer wall 17 between which is interposed suitable insulating material 18.

Steam enters the jacket space 14 through a steam inlet pipe 19 which is provided with a shut-off valve, generally indicated by the numeral 21, and a throttling valve, generally indicated by the numeral 22. The steam after condensing in the jacket space 14, and particularly on the side walls of the vat 11, condenses and flows to a condensate drain line 23. The bottom walls of the jacket 13 are sloped toward the condensate drain line so that condensate will freely flow to the condensate line 23. The condensate flows through the line 23 to a trap 24 controlled by a valve 26. The condensate when the line 23 and the trap are filled with condensate overflows through a condensate overflow pipe 27. It will be noted that the condensate overflow and the trap form a U-shaped path for the condensate so that the condensate outlet is sealed against the entrance of air.

In passing through the condensate drain line the condensate comes in contact with a bulb 28 which contains a temperature responsive medium or gas, which expands in accordance with the temperature. The bulb 28 is connected by a flexible tube 29, as shown in Fig. 1, to the throttling valve 22. The bulb 28, together with its flexible tube 29, is connected in the condensate drain line through an air tight connection indicated at 31.

The throttling valve, as shown more clearly in Fig. 3, comprises a frame 32 in which is mounted a flexible metallic bellows 33, the interior of the bellows having a connection with the flexible tube 29, as indicated at 34. A rod 36 is connected to the lower end of the bellows and is slidably mounted in a bracket 37 carried by the frame 32. The rod 36 is connected by means of an adjustable connection 38 to a valve rod 39. The valve rod 39 extends through a bracket 41 formed integral with the frame 32 and has secured at its lower end a valve member 42 adapted to engage a seat 43 formed in a valve body 44. The valve body 44 is suitably connected in the steam line 19, as indicated at 45. A spring 46 has one end bearing against a spring seat 47 carried by the bracket 37 and the other end, as indicated at 48, bearing against the bellows 33. The action of the spring is to compress the bellows, pull the rod 36 and the valve rod 39 upward, and retain the valve 42 spaced from its seat 43.

The shut-off valve, generally indicated by the numeral 21, is controlled by the temperature of the vat contents. As shown in Fig. 1, a bulb 51 containing a temperature responsive medium extends through an opening in the cover 12 and is submerged in the contents of the vat. The bulb 51 is connected by a flexible conduit 52 to a recording thermometer 53. The recording thermometer (Fig. 6) per se, constitutes no part of my present invention, and since recording thermometers suitable for my purpose are well known in the art to which this invention applies, need not be more particularly described except to state that the flexible tube is connected to a pressure responsive coiled spring tubing 54 which tends to expand or unwind as the pressure therein increases. The spring tubing 54 is connected by suitable linkage to a recording arm 56 adapted to record the temperature on a chart 57 and to an arm 58 which carries contacts 59. The contacts 59 engage contacts 61 to close a circuit 60 through a solenoid, generally indicated by the numeral 62. By suitable adjustment not necessary to be more particularly described, as, for example, by varying the distance between the contacts 59 and 61, the recording thermometer may be set to operate the solenoid when the vat contents reach any desired temperature.

The solenoid core 63 is connected to a rod 64, the lower end of which is enlarged, as shown at 66. A collar 68 is slidably mounted on the rod 64. Between the collar 68 and the enlargement 66 is a coiled spring 69. A pivot arm 67 is carried by a depending bracket 71 to which it is pivotally secured, as indicated at 72. The depending bracket 71 is rigidly secured to or integral with an arm 73 carried by the valve body 74 of the shut-off valve 21. The arm 73, as shown more clearly in Fig. 5, may be mounted in position on the valve body, by means of a nut 76 threaded on the lower end of the valve body. The lower end of the valve body is extended and threaded to receive a collar 77 which serves as a guide for a valve stem 78.

The valve stem 78 extends upward through the valve body and has rigidly secured thereto, adjacent its upper end, a valve member 79. Valve member 79 is adapted to engage a seat 81 formed in the valve body and the valve body is secured in the steam line 19, as indicated at 82. The valve stem 78 projects above the valve member 79 and the projecting portion 83 is slidable in a bore 84 formed in a nut 86 threaded to the valve body, as indicated at 87. The nut is provided with an annular bore 88 for the reception of a spring 89, one end of which engages the end of the annular bore. The other end of the spring engages the valve member 79 and normally urges it into engagement with the valve seat 81. The outer end of the pivot arm 67 has secured in a threaded aperture thereof a bolt 91, the head of which engages the lower end of the valve stem. A nut 92 is threaded on the projecting end of the bolt 91. Upon clockwise movement of the pivot arm, as viewed in Fig. 4, about the pivot 72, the valve stem is moved upward against the action of the spring 89 to open the valve and upon counterclockwise movement of the pivot arm 67 under the action of the spring the valve is closed.

A latch is provided for retaining the pivot arm 67 in such position as to retain the valve member 79 in the open position, against the action of the spring. The latch comprises a latch member 93 pivoted on a pivot pin 94 carried by two brackets 95 depending from the arm 73. The latch member 93 is L-shaped, and has the end of one arm thereof provided with a notched portion 96 which engages in a cooperating notch 97 provided on the pivot arm 67. The other arm of the latch member has an aperture for receiving the rod 64. A stop 99 carried by the depending brackets 95 limits the outward movement of the latch member 93.

The jacket space 14 is provided with an overflow tube 101 which extends into the trap 24 and connects with the condensate overflow 27. The overflow pipe is used particularly when the vat is to be cooled by water flowing through the jacket, the flow of steam out of the overflow being sealed by the water seal above mentioned and the valve 26 also controlling this overflow pipe.

In operation the vat is filled with the material to be processed, for example, milk to be pasteurized, and the cover closed with the bulb 51 in position. The solenoid operated shut-off valve 21 is then opened by manually pushing downward on the pivot arm 67 to thus raise the valve stem 78 and latch it by means of the latch 93 in its uppermost position against the action of the spring. The recording thermometer 53 is set so that the solenoid 62 will be actuated substantially when the vat contents reach the desired temperature. Preferably the recording thermometer is set so that steam will be shut-off by means of the shut-off valve 21 just prior to the contents of the vat reaching the desired temperature so that the vat contents will not override the desired temperature.

After the shut-off valve has been opened steam flows into the jacket space 14 (since the throttling valve is then fully open) up around the walls of the vat where heat transfer takes place. The steam condenses on the walls and gradually flows downward into the condensate drain line 23. As the walls are cold during the first portion of the heating the condensate will be cold. As the walls of the vat gradually heat up the temperature difference between the incoming steam and the walls decreases, and hence the condensate gradually increases in temperature. The condensate in the drain line gradually heats the temperature responsive medium in the bulb 28 and after reaching the temperature for which the adjustment 38 has been made, the bellows start to expand against the action of the spring 46 to gradually move the valve member 42 toward its seat 43. The gradual closing of the throttling valve 22 does not take place until the condensate temperature is relatively high so that throttling of the steam does not take place until the vat contents are somewhere near their desired temperature. When the condensate reaches the desired temperature, valve 22 starts to throttle gradually diminishing the flow of steam through the steam inlet line 19. The valves 21 and 22 are coordinated so that just prior to the operation of the solenoid operated shut-off valve there is only a slight flow of steam to the jacket space 14 so that there will be little tendency for the temperature of the contents of the vat to override the desired temperature. When the vat contents reach the desired temperature, preferably slightly under the desired temperature, the contacts 59 and 61 engage closing the circuit through the solenoid. The solenoid pulls the rod 64 upward until the member 68 engages the latch member 93 after which the spring 69 is compressed, snaps the latch upward to release the arm 67. The shut-off valve 21 thereupon closes.

It will be appreciated that if the steam inlet line 19 were controlled solely by the temperature of the vat that the temperature would be likely to override the desired temperature, because there would be a full flow of steam to the jacket just prior to shut-off. It will further be appreciated that it would not be practical to control the temperature of the contents of the vat by condensate temperature alone, since such control would not be accurate. However, the combination of the two valves enables a close control of temperature so that the milk or cream being pasteurized or other material being processed is quickly heated to a temperature somewhat below the desired temperature, at which point the valve 22 starts to throttle, being almost closed at the time the solenoid operated shut-off valve 21 is operated. The temperature of the steam may be 212° F. or if desired a higher temperature may be employed. Moreover, it is possible to employ a vacuum pump on the jacket space so as to operate the jacket under subatmospheric conditions.

While I have shown and described a manual reset type of shut-off valve, it would be possible to employ a valve responsive to the temperature of the vat contents so as to require no manual setting.

Moreover, while I have shown the shut-off valve as being operated by a recording thermometer, it will be appreciated that this is not essential. Further I have shown the shut-off valve 21 as being solenoid operated, but it will, of course, be understood that the shut-off valve may be mechanically operated. Other modifications and arrangements will be apparent to those skilled in the art, and these equivalents I desire to include within the scope of my invention as set forth in the appended claim.

I claim:

A control for a liquid treating apparatus wherein a vat is substantially surrounded by a steam jacket, including the combination of an inlet conduit for admitting steam to the jacket, a device containing a fluid medium exposed to the condensate from said jacket and responsive to the temperature thereof, a valve in said steam inlet conduit, a spring normally urging said valve open, a pressure responsive element operatively connected to said valve and connected to said device to close the valve gradually against the action of said spring as the temperature of the condensate rises, said valve being set to start closing as the temperature of the contents of the vat approach the desired temperature and to reach almost a closed condition prior to the contents of the vat reaching the desired temperature, a second valve in said steam inlet conduit, a spring normally urging said valve to a closed position, latch means for normally retaining said valve open against the action of said spring, and means controlled by the temperature of the contents of the vat for closing said second valve to cut off the supply of steam substantially when the vat contents reach the desired temperature.

RUDOLPH F. GOECKE.